(12) United States Patent
Nishikiori et al.

(10) Patent No.: US 7,403,920 B2
(45) Date of Patent: Jul. 22, 2008

(54) INFORMATION MEDIATING APPARATUS AND METHOD AND STORAGE MEDIUM STORING INFORMATION MEDIATING PROGRAM THEREIN

(75) Inventors: Masaaki Nishikiori, Kawasaki (JP); Yasuhiko Hashizume, Kawasaki (JP); Yuji Takada, Kawasaki (JP); Takashi Yabe, Kawasaki (JP); Hiroki Hasegawa, Kawasaki (JP); Takao Mohri, Kawasaki (JP); Tadashige Iwao, Kawasaki (JP); Shigeki Fukuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1026 days.

(21) Appl. No.: 09/738,285

(22) Filed: Dec. 18, 2000

(65) Prior Publication Data

US 2001/0051898 A1    Dec. 13, 2001

(30) Foreign Application Priority Data

Jan. 14, 2000    (JP)    ............................. 2000-005176

(51) Int. Cl.
*G06F 40/00* (2006.01)
(52) U.S. Cl. ........................................... 705/37; 707/4
(58) Field of Classification Search ................... None
See application file for complete search history.

(56) References Cited

U.S. PATENT DOCUMENTS 5,418,943 A * 5/1995 Borgida et al. .................. 707/4
5,987,446 A * 11/1999 Corey et al. .................... 707/3

FOREIGN PATENT DOCUMENTS

EP    000770967 A2 *    2/1997

OTHER PUBLICATIONS

Fernandes, C. S. T., "A dialogue-enhanced mediator to discover user intent in heterogenous database queries", Northwest University, 2000.*

* cited by examiner

*Primary Examiner*—Hani M. Kazimi
*Assistant Examiner*—Olabode Akintola
(74) *Attorney, Agent, or Firm*—Staas & Halsey LLP

(57) ABSTRACT

An information mediating apparatus has: a mediating condition file in which mediating condition list data describing specific mediating conditions has been stored; and a personal information file in which personal information peculiar to a person, a group, or the like has been stored. A mediation service processing unit reads out the mediating condition list data designated in response to a mediating request from the user from the mediating condition file, notifies a backend server in a service providing server group, collects and selects service information matched with the mediating condition list data, and displays it to the user. The mediating service processing unit is constructed by: a user interface processing unit having an HTML forming function; and a logic processing unit described as an information mediating program.

20 Claims, 15 Drawing Sheets

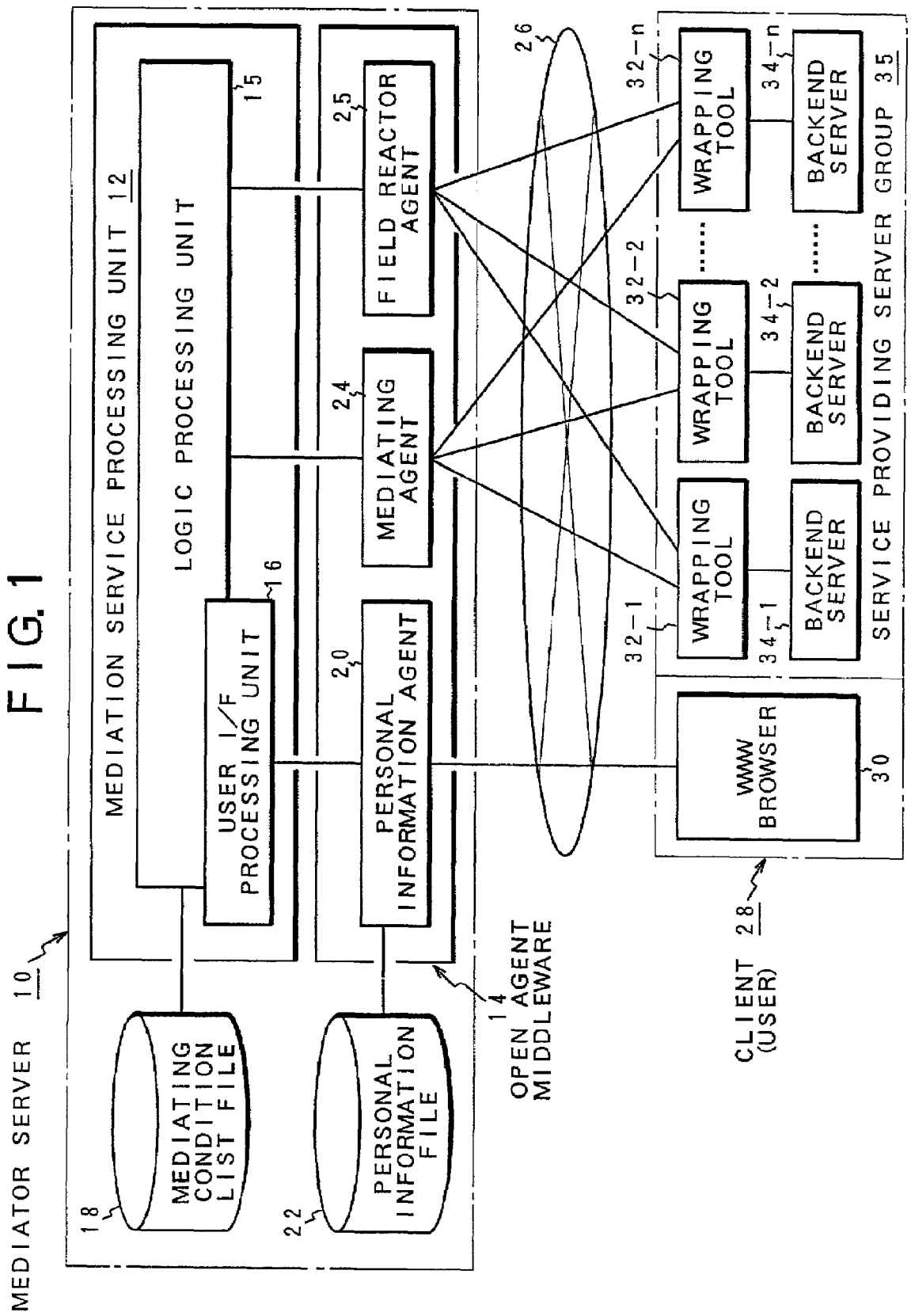

FIG. 2

18-1 MEDIATING CONDITION LIST DATA

OFFICE (SMALL)

| REAL ESTATE | | | | | |
|---|---|---|---|---|---|
| TYPE | COMMUTING | CONTRACT FORM | CITY NAME | THE NUMBER OF PERSONS | SIZE |
| OFFICE | TRAIN | LEASE | NULL | REQUIRED | CALCULATION |

| OFFICE FURNITURE | | | | | |
|---|---|---|---|---|---|
| TYPE | MANUFACTURER | DESK TYPE | THE NUMBER OF DESKS | UNIT PRICE | STOCK | INITIAL EXPENSES | MONTHLY EXPENSES |
| DESK | | OFFICE DESK | CAL. | | | | |
| TYPE | MANUFACTURER | CHAIR TYPE | THE NUMBER OF CHAIRS | UNIT PRICE | STOCK | INITIAL EXPENSES | MONTHLY EXPENSES |
| CHAIR | | OFFICE CHAIR | CAL. | | | | |

| OFFICE EQUIPMENT | | | | | |
|---|---|---|---|---|---|
| TYPE | MANUFACTURER | APPARATUS TYPE | THE NUMBER OF APPARATUSES | UNIT PRICE | STOCK | INITIAL EXPENSES | MONTHLY EXPENSES |
| COPY | | DESKTOP | CAL. | | | | |
| TYPE | MANUFACTURER | APPARATUS TYPE | THE NUMBER OF PCS | UNIT PRICE | STOCK | INITIAL EXPENSES | MONTHLY EXPENSES |
| PC | | NOTEBOOK | CAL. | | | | |

FIG. 3

22 PERSONAL INFORMATION FILE

| | |
|---|---|
| NAME : | TARO FUJI |
| PASSWORD : | aaaaaa |
| ADDRESS : | TOKYO |
| OCCUPATION : | ENGINEER |
| PLACE OF WORK : | F COMPANY |
| TELEPHONE (OFFICE) : | 03-XXXX-XXXX |
| TELEPHONE (HOME) : | 045-YYY-YYYY |
| PRESENT LOCATION : | OFFICE |

FIG. 5

MEDIATING CONDITION MANAGEMENT PICTURE PLANE   46-1

| TYPE | COMMUTING | CONTRACT FORM | CITY NAME | THE NUMBER OF PERSONS | SIZE |
|---|---|---|---|---|---|
| OFFICE | TRAIN | LEASE | NULL | REQUIRED | CALCULATION |

| CONTROL | REAL ESTATE | OFFICE FURNITURE | OFFICE EQUIPMENT |
|---|---|---|---|

FIG. 6

MEDIATING CONDITION MANAGEMENT PICTURE PLANE 46-2

| TYPE | COMMUTING | CONTRACT FORM | CITY NAME | THE NUMBER OF PERSONS | SIZE |
|------|-----------|---------------|-----------|----------------------|------|
| OFFICE | TRAIN | LEASE | TOKYO | 10 | 100 |

| CONTROL | REAL ESTATE | OFFICE FURNITURE | OFFICE EQUIPMENT |
|---------|-------------|------------------|------------------|

FIG. 7

MEDIATING CONDITION MANAGEMENT PICTURE PLANE 46-3

| TYPE | MANUFACTURER | DESK TYPE | THE NUMBER OF DESKS | UNIT PRICE | STOCK | INITIAL EXPENSES | MONTHLY EXPENSES |
|---|---|---|---|---|---|---|---|
| DESK | | OFFICE DESK | CAL. | | | | |
| TYPE | MANUFACTURER | DESK TYPE | THE NUMBER OF CHAIRS | UNIT PRICE | STOCK | INITIAL EXPENSES | MONTHLY EXPENSES |
| CHAIR | | OFFICE CHAIR | CAL. | | | | |

| CONTROL | REAL ESTATE | OFFICE FURNITURE | OFFICE EQUIPMENT |
|---|---|---|---|

FIG. 8

MEDIATING CONDITION MANAGEMENT PICTURE PLANE 46-4

| TYPE | MANUFACTURER | APPARATUS TYPE | THE NUMBER OF APPARATUSES | UNIT PRICE | STOCK | INITIAL EXPENSES | MONTHLY EXPENSES |
|---|---|---|---|---|---|---|---|
| COPY | | DESKTOP | 1 | | | | |
| TYPE | MANUFACTURER | APPARATUS TYPE | THE NUMBER OF PCS | UNIT PRICE | STOCK | INITIAL EXPENSES | MONTHLY EXPENSES |
| PC | | NOTEBOOK | CAL. | | | | |

| CONTROL | REAL ESTATE | OFFICE FURNITURE | OFFICE EQUIPMENT |
|---|---|---|---|

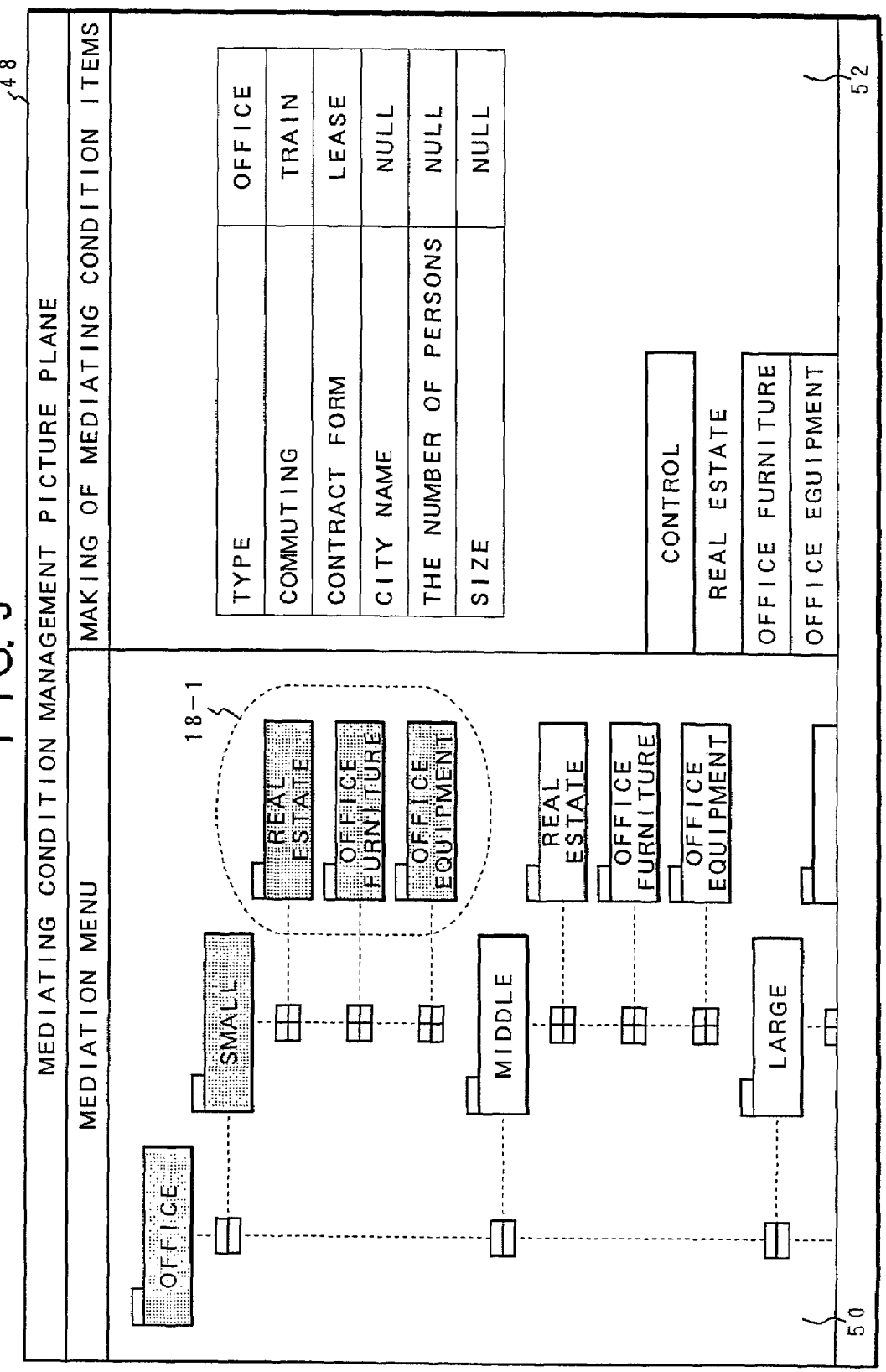

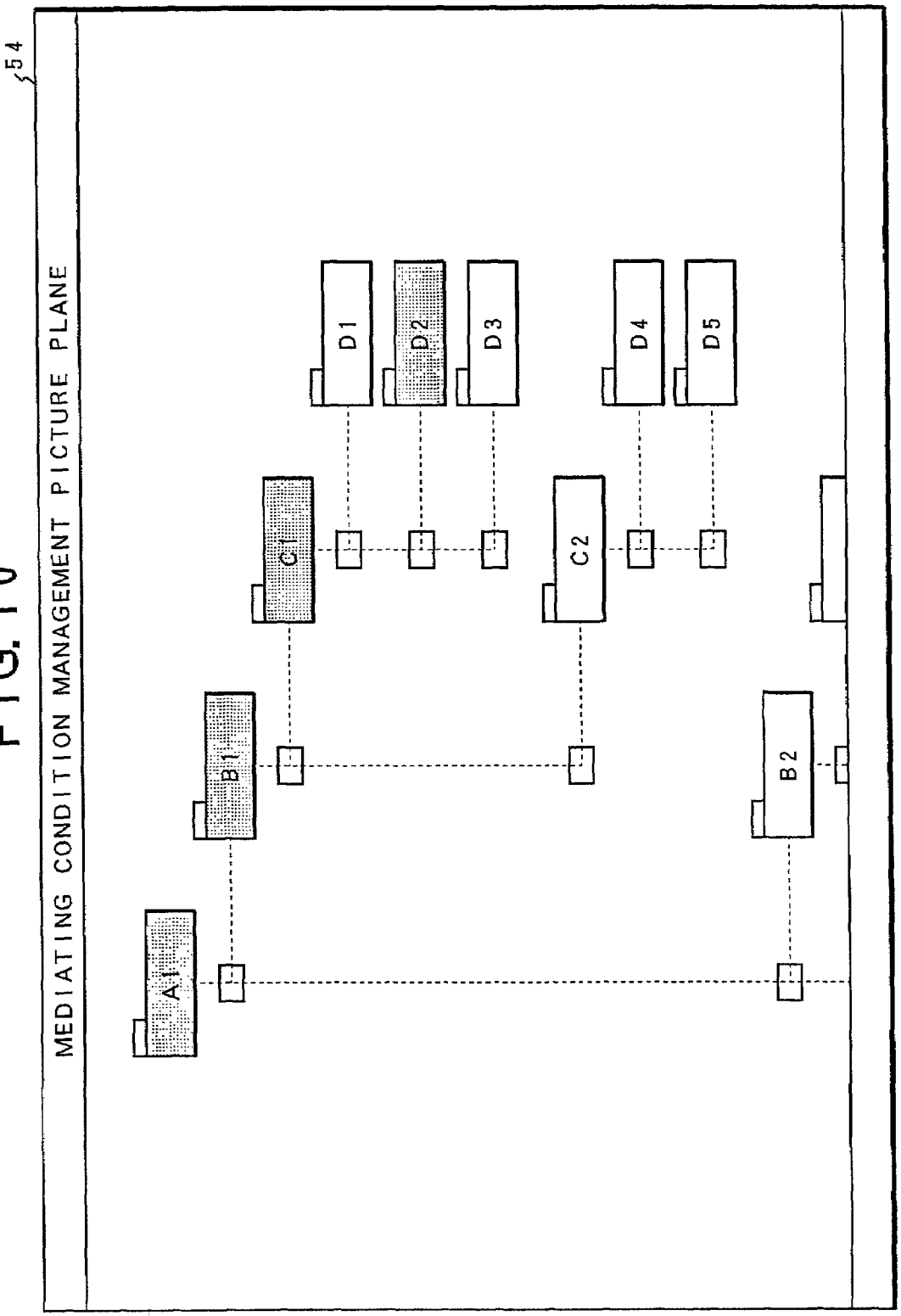

FIG. 11

MEDIATION ANSWER PICTURE PLANE 60-1

WE INTRODUCE THE FOLLOWING PROPERTIES FOR YOUR REQUEST.
PLEASE SELECT YOUR FAVORITE ITEMS.

IF YOUR FAVORITE PROPERTY IS NOT FOUND
PLEASE CHANGE THE CONDITIONS AND TRY AGAIN.

TOTAL COST ¥7,558,000

62~ ORDER    RETRY ~64

REAL ESTATE

| DISTRICT | TYPE | COMMUTING | CONTRACT FORM | THE NEAREST STATION | ADDRESS | THE NUMBER OF PERSONS | DEPOSIT |
|---|---|---|---|---|---|---|---|
| TOKYO | OFFICE | TRAIN | LEASE | OTEMACHI | 1-6, OTEMACHI, CHIYODA-KU | 100 | 4,200,000 |

OFFICE FURNITURE

| TYPE | MANUFACTURER | DESK TYPE | THE NUMBER OF DESKS | UNIT PRICE | STOCK | INITIAL EXPENSES | MONTHLY EXPENSES |
|---|---|---|---|---|---|---|---|
| DESK | Y COMPANY | OFFICE DESK | 10 | 23,000 | 25 | 230,000 | 0 |

| TYPE | MANUFACTURER | CHAIR TYPE | THE NUMBER OF CHAIRS | UNIT PRICE | STOCK | INITIAL EXPENSES | MONTHLY EXPENSES |
|---|---|---|---|---|---|---|---|
| CHAIR | Y COMPANY | OFFICE CHAIR | 10 | 78,000 | 25 | 780,000 | 0 |

OFFICE EQUIPMENT

| TYPE | MANUFACTURER | APPARATUS TYPE | THE NUMBER OF APPARATUSES | UNIT PRICE | STOCK | INITIAL EXPENSES | MONTHLY EXPENSES |
|---|---|---|---|---|---|---|---|

FIG. 12

MEDIATION ANSWER PICTURE PLANE

TOTAL COST ¥7,558,000

[ORDER] 62  [RETRY] 64

REAL ESTATE

| DISTRICT | TYPE | COMMUTING | CONTRACT FORM | THE NEAREST STATION | ADDRESS | THE NUMBER OF PERSONS | DEPOSIT |
|---|---|---|---|---|---|---|---|
| TOKYO | OFFICE | TRAIN | LEASE | OTEMACHI | 1-6, OTEMACHI, CHIYODA-KU | 100 | 4,200,000 |

OFFICE FURNITURE

| TYPE | MANUFACTURER | DESK TYPE | THE NUMBER OF DESKS | UNIT PRICE | STOCK | INITIAL EXPENSES | MONTHLY EXPENSES |
|---|---|---|---|---|---|---|---|
| DESK | Y COMPANY | OFFICE DESK | 10 | 23,000 | 25 | 230,000 | 0 |
| TYPE | MANUFACTURER | CHAIR TYPE | THE NUMBER OF CHAIRS | UNIT PRICE | STOCK | INITIAL EXPENSES | MONTHLY EXPENSES |
| CHAIR | Y COMPANY | OFFICE CHAIR | 10 | 78,000 | 25 | 780,000 | 0 |

OFFICE EQUIPMENT

| TYPE | MANUFACTURER | APPARATUS TYPE | THE NUMBER OF APPARATUSES | UNIT PRICE | STOCK | INITIAL EXPENSES | MONTHLY EXPENSES |
|---|---|---|---|---|---|---|---|
| COPY | B COMPANY | DESKTOP | 1 | 500,000 | 2 | 500,000 | 0 |
| TYPE | MANUFACTURER | APPARATUS TYPE | THE NUMBER OF PCS | UNIT PRICE | STOCK | INITIAL EXPENSES | MONTHLY EXPENSES |
| PC | F COMPANY | NOTEBOOK | 10 | 268,000 | 15 | 2,680,000 | 0 |

TOTAL COST ¥7,559,000

[ORDER] 62  [RETRY] 64

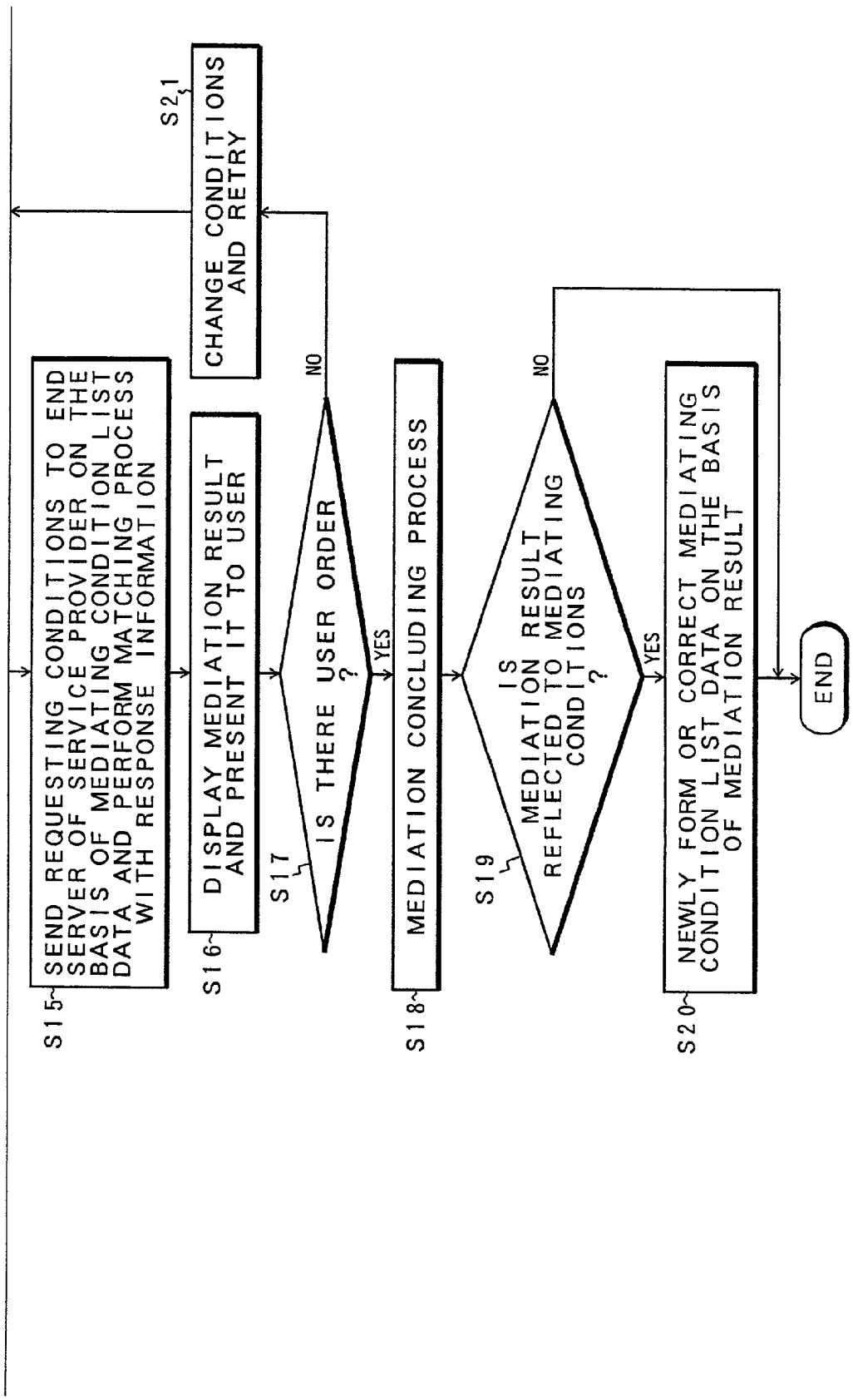

INFORMATION MEDIATING APPARATUS AND METHOD AND STORAGE MEDIUM STORING INFORMATION MEDIATING PROGRAM THEREIN

BACKGROUND OF THE INVENTION

1. Field of the Invention

The present invention relates to information mediating apparatus and method for providing information mediation services on a network and to a computer-readable storage medium in which an information mediating program has been stored. More particularly, the invention relates to information mediating apparatus and method for receiving an uncertain and rough request from the user and providing detailed mediation service information and to a computer-readable storage medium in which an information mediating program has been stored.

2. Description of the Related Arts

Hitherto, as a technique of providing information mediation services on a network such as Internet, Intranet, or the like, for example, a service constructing technique on the Web through CGI (Common Gateway Interface) or an application server constructing environment such as IBM WebShare (registered trademark) or the like has been provided. The information mediation services on the Internet spreads to various fields such as real estate, ordering management, order receiving management, manufacturing management, and the like. On the basis of a mediation service request from the user, a mediating system generates a specific requesting condition to a backend server (server of a service provider) in the service environment, collects, selects, and further adjusts information to satisfy the user request from the backend server, and presents mediating information matching with the request to the user. To construct such a mediating system, the user needs to input detailed conditions for enabling the matching to be promptly performed as an input to the mediating system each time or to make a program for applying an abstract request from the user to detailed conditions.

However, according to the mediating system in which the user inputs the detailed conditions for enabling the matching to be promptly performed each time, it is troublesome for the user to input. Accordingly, there is such a fear that the system becomes a nominal mediating system. According to the mediating system for applying the abstract request of the user to the detailed conditions by the program, the request is applied to the detailed conditions on the basis of information common to all of the users. The user has to input his personal information each time he executes the mediating operation. Naturally, although the personal information can be selected from a lot of output results of the mediating system on the basis of the user's personal taste or the like, it takes time to accumulate the mediation results and, during the accumulation, the user needs to input it each time he executes the mediating operation. In the conventional mediating system, therefore, the preparing operation to start providing services needs time of about a few months, and it takes a long time to start the operation. Although know-how is accumulated in association with the use of the services, reflecting the accumulated know-how to the mediating process has not be considered. When reflecting the accumulation of know-how to the system is considered, the number of steps required to develop the system increases enormously. In the mediating system, further, although it is effective to consider personal information peculiar to the user or a group serving as a requesting source, the number of steps needed for developing the system is also very large when taking into consideration the personal information.

SUMMARY OF THE INVENTION

According to the invention, there are provided information mediating apparatus and method in which a period that is needed until services are provided is short, in response to an abstract mediating request of the user, know-how of a mediator and personal information of the requesting user are effectively utilized and proper conditions are sent to the provider so that information can be collected, selected, and adjusted, and a storage medium in which an information mediating program has been stored is also provided.

According to the invention, there is provided an information mediating apparatus for providing mediation services to the user, comprising: a mediating condition storing unit in which mediating condition list data which describes specific mediating conditions necessary for mediation has been stored; and a mediation service processing unit which reads out the mediating condition list data designated in correspondence to a user request from the mediating condition storing unit, obtains a specific condition in the read-out mediating condition list data from another information storing unit, merges it, searches information which satisfies the merged condition, and presents it to the user. The mediation service processing unit has: a user interface processing unit which forms (HTML forming mechanism) display information such as mediating menu, mediation result, and the like and presents it to the user; and a logic processing unit which reads the mediating condition list data, notifies a service providing server group of the data, and forms mediation result information on the basis of matching with service information. Accordingly, in the mediating information apparatus of the invention, a portion to be developed every user is small. When the kind of business of the user is similar to the provided service, the logic processing unit can be used in common. It is sufficient to prepare the mediating condition list data and personal information. Consequently, a period which is required until services are provided can be remarkably reduced, for example, from a few months required so far to a few days. It is possible to easily perform the operation sharing such that a provider of the apparatus according to the invention develops the portion of the logic processing unit of the mediation service processing unit and customizes the user interface processing unit, a mediator forms the mediating condition list data, and the user who uses the services registers his personal information. The maintenance for each operation can be independently performed. Particularly, in the conventional mediating system, a portion of the mediating condition list data corresponding to know-how of mediation is described by source codes as a program and it is necessary to correct the source codes even for the correction of the know-how portion. According to the invention, however, since the portion of the know-how of mediation has a list type data structure in which the specific mediating conditions are arranged, the addition, correction, and deletion of the mediating conditions can be simply and easily performed. The mediation service processing unit analyzes an uncertain, rough, and abstract mediating request from the user, for example, "I want to establish my office in front of a station", thereby designating specific mediating condition list data and reading it out. It is also possible to construct the apparatus in such a manner that when the uncertain, rough, and abstract request from the user is received, the mediation service processing unit presents a selection menu in which the contents of requests are classified into items to the user and designates and reads out the specific mediating list data in correspondence to the selected item of the menu. When referring conditions of the personal information exist in the read-out mediating condition list data, the mediation service processing unit refers to a personal information storing unit in which personal information peculiar to a person, a group, or the like has been stored, extracts the corresponding personal information, and merges it into the referring conditions. By merging the personal information peculiar to the user into the mediating condition list data as know-how information common to the users and matching with the provider (information provider) as mentioned above, a troublesomeness such that the user inputs the personal information is eliminated and a fine service can be provided. When the referring conditions of the personal information storing unit exist in the read-out mediating condition list data, the mediation service processing unit refers to the personal information storing unit, extracts the corresponding personal information, and merges it into the referring conditions. When the corresponding personal information does not exist, the unit requests the user to input his personal information. As mentioned above, by allowing the user to input the mediating conditions and dynamic conditions, insufficient conditions, incongruent conditions, and the like which are difficult to be expressed by the personal information, the matching with high precision can be realized. When the inquiring conditions for the user exist in the read-out mediating condition list data, the mediation service processing unit directly requests the user to input his personal information. When the inquiring conditions for the user exist in the read-out mediating condition list data, the mediation service processing unit can merge the corresponding personal information as default values by referring to the personal information storing unit, and after that, request the user to input the personal information while presenting the default values to the user. When calculating conditions exist in the read-out mediating condition list data, the mediation service processing unit executes a predetermined calculating expression on the basis of other mediating conditions and merges the calculation result into the calculating conditions. More specifically, the mediation service processing unit executes a predetermined calculating expression on the basis of the conditions merged by referring to the personal information storing unit or by inquiring of the user and merges the calculation result into the calculating conditions. Among the mediating conditions, for example, in case of a mediation service of establishing an office, a calculating expression to derive a necessary office area on the basis of the number of persons as one of the specific mediating conditions is defined. Therefore, if the number of persons is decided as a user inquiring condition, the office area derived by the predetermined calculating expression can be properly calculated as a mediating condition. Know-how of mediation is reflected to the calculating expression itself. When the mediating condition list data read out from the mediating condition storing unit has a layer structure, the mediation service processing unit obtains and merges the conditions by sequentially referring to the personal information storing unit in order from a predetermined layer, by inquiring of the user, and/or by performing the calculating process. As for the mediating condition list data specifically describing the request from the user, in addition to a method of listing a plurality of conditions, there is also a case where it is desired to have a layer structure because it is necessary to narrow down the specific conditions more specifically. In such a case, the abstract request of the user is converted to the more specific request by deciding the mediating conditions for each layer. As for the layer structure of the mediating condition item list data, there are two methods of layering a combination of a plurality of files and layering the contents of a single file.

The mediation service processing unit forms new mediating condition list data on the basis of the mediation result decided by presenting it to the user and stores it to the mediating condition storing unit. Consequently, the mediation result can be reflected as know-how to the mediating condition list data.

According to the invention, there is provided an information mediating method of providing mediation services to the user, comprising the steps of:

storing mediating condition list data describing specific mediating conditions into an external mediating condition storing unit;

reading out the mediating condition list data designated in response to a user request from the mediating condition storing unit;

obtaining and merging a specific condition in the read-out mediating condition list data by referring to an information storing unit in which other information such as personal information peculiar to a person or a group and the like has been stored, by inquiring of the user, and/or by performing a calculating process based on predetermined conditions; and notifying a group of service providing servers of the decided mediating condition list data, collecting and selecting information which satisfies the mediating condition list data, and presenting the mediation result to the user.

According to the invention, there is also provided a computer-readable storage medium in which an information mediating program to provide mediation services for the user has been stored, wherein the information mediating program stored in the storage medium comprises the steps of:

storing mediating condition list data describing specific mediating conditions into an external mediating condition storing unit;

reading out the mediating condition list data designated in correspondence to the user request from the mediating condition storing unit;

obtaining and merging a specific condition in the read-out mediating condition list data by referring to an information storing unit in which other information such as personal information peculiar to a person or a group and the like has been stored, by inquiring of the user, and/or performing a calculating process based on predetermined conditions, thereby notifying a group of service providing servers of the decided mediating condition list data; and collecting and selecting information which satisfies the mediating condition list data, thereby forming the mediation result to be presented to the user.

The above and other objects, features, and advantages of the present invention will become more apparent from the following detailed description with reference to the drawings.

BRIEF DESCRIPTION OF THE DRAWINGS

FIG. 1 is an explanatory diagram of a system construction using an information mediating apparatus of the invention;

FIG. 2 is an explanatory diagram of a mediating condition list file in FIG. 1;

FIG. 3 is an explanatory diagram of a personal information file in FIG. 1;

FIG. 5 is an explanatory diagram of a management picture plane of real estate in mediating condition list data in FIG. 2;

FIG. 6 is an explanatory diagram of a management picture plane of real estate which is decided by reference to personal information, a user inquiry, and a calculating process;

FIG. 7 is an explanatory diagram of a management picture plane of office furniture in the mediating condition list data in FIG. 2;

FIG. 8 is an explanatory diagram of a picture plane of office equipment in the mediating condition list data in FIG. 2;

FIG. 9 is an explanatory diagram of a management picture plane in which the mediating condition list data in FIG. 2 is expressed by a directory structure;

FIG. 10 is an explanatory diagram of a management picture plane in which mediating condition list data of a layer type is expressed by a directory structure;

FIG. 11 is an explanatory diagram of a mediation answer picture plane to a menu designation in FIG. 4;

FIG. 12 is an explanatory diagram of the mediation answer picture plane obtained by scrolling a sequel to FIG. 11; and FIGS. 13A to 13C are flowcharts for an information mediating process in FIG. 1.

DETAILED DESCRIPTION OF THE PREFERRED EMBODIMENT

Figure 4:
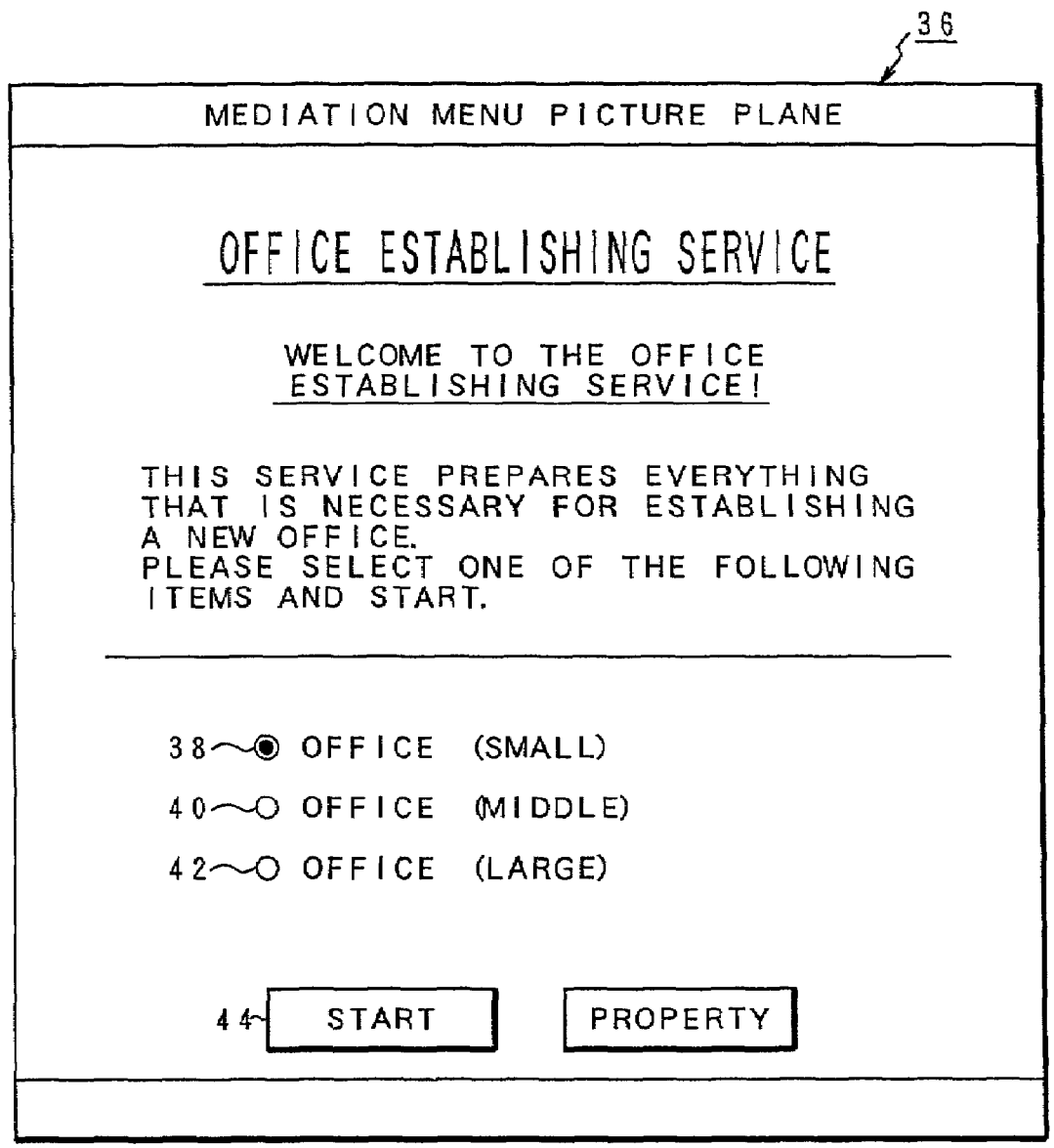
FIG. 4 is an explanatory diagram of a mediation menu picture plane which is presented to the user.

FIG. 1 is an explanatory diagram of a mediation service system using an information mediating apparatus according to the invention. The information mediating apparatus of the invention is provided for a mediator server 10. A mediation service processing unit 12 and an open agent middleware 14 are provided for the mediator server 10. The mediation service processing unit 12 is constructed by a logic processing unit 15 and a user interface processing unit 16 and a mediating condition list file 18 is connected to the logic processing unit 15. The open agent middleware 14 is a platform including a plurality of agent groups. In a mediating process according to the invention, the open agent middleware 14 has a personal information agent 20, a mediating agent 24, and a field reactor agent 25. A personal information file 22 is connected to the personal information agent 20. A WWW browser 30 of a client 28 serving as a user side is connected to the personal information agent 20 through a network 26 such as the Internet, Intranet, or the like. Backend servers 34-1, 34-2, . . . , and 34-n provided for a service providing server group 35 are connected to the mediating agent 24 and field reactor agent 25 of the open agent middleware 14, through wrapping tools 32-1, 32-2, . . . , and 32-n via the network 26, respectively. For example, in the case where the user requests a mediation service for an office establishment, the backend servers 34-1 to 34-n are servers possessed by traders who handle real estate, office furniture, office equipment, and the like which are necessary for establishing an office. The wrapping tools 32-1 to 32-n respectively provided for the backend servers 34-1 to 34-n are programs for obtaining an interlocking relation between specific server requesting conditions from the mediating agent 24 and field reactor agent 25 on the open agent middleware 14 side and the backend servers 34-1 to 34-n. Each of the wrapping tools 32-1 to 32-n is constructed for every kind of backend servers 34-1 to 34-n. The wrapping tools 32-1 to 32-n can be also provided on the open agent middleware 14 side. As an example of the wrapping tools 32-1 to 32-n, conditions requested from the open agent middleware 14 side, for example, a discount correspondence logic or the like which is used in the case where another company which competes for the same product appears is constructed. The mediation service processing unit 12 and mediating condition list file 18 for realizing the mediating apparatus of the invention provided for the mediator server 10 will now be described. First, in the mediating condition list file 18, a set of mediating conditions for converting an uncertain, rough, and abstract request from the user into a specific request to the backend servers 34-1 to 34-n which actually present services is defined as mediating condition list data.

FIG. 2 shows an example of the mediating condition list data for converting an uncertain, rough, and abstract request such that "We want to establish an office in front of a station" from the user into a specific request to the backend servers 34-1 to 34-n. By assuming such an abstract request that "We want to establish an office in front of a station", in the mediator server 10, for example, an office scale is previously divided into three scales of large, middle, and small by using a know-how of mediation, and mediating condition list data 18-1 for a small office, mediating condition list data 18-2 for a middle-sized office, and mediating condition list data 18-3 for a large office are prepared. In each of those three kinds of mediating condition list data 18-1 to 18-3, as shown in the mediating condition list data 18-1 for a small office, mediation items are classified into the following three items I. Real estate II. Office furniture III. Office equipment and the specific mediating conditions are described. For example, when considering the head mediation item "real estate" as an example, a type, commuting, a contract form, a city name, the number of persons, and a size are described. On the basis of the know-how of the mediator, the type is set to "office" and commuting is set to commuting by train as "train" because the user request needs a location "in front of a station" and a place within a walking distance from the station. The contract form is set to "lease". As for the following city name, since it is decided from the personal information peculiar to the user with reference to the personal information file 22, which will be explained hereinbelow, for example, "NULL" is set as a code indicating that the personal information is referred to. Since it is necessary to inquire of the user about the number of persons, a code "REQUIRED" indicative of the user inquiry has been stored. Further, with respect to the size showing an office area, when "the number of persons" obtained by inquiring of the user is decided, the office size, namely, floor area is determined by a predetermined calculating expression. Therefore, a code "CALCULATION" showing that it is set by the calculating expression is set. Items of a type, a manufacturer, a chair type, the number of chairs, a unit price, stock, initial expenses, and monthly expenses (running costs) are provided for the next item "office furniture". A type and a desk type which have been predetermined in accordance with the know-how of the mediator are set to "desk" and "office desk", respectively. Since the number of desks can be obtained by the number of persons which is decided by the first user's inquiry about "real estate", a code "CAL." indicating that the number of desks can be obtained by a calculating expression is set. Since the other items of a manufacturer, a unit price, stock, initial expenses, and monthly expenses are service providing information which is obtained by actually sending the mediating conditions to the backend servers 34-1 to 34-n, they are set to blanks. This point is also similarly applied to the next type "chair". As shown in the type, "copy" and "PC (personal computer)" are fixedly set also with respect to the third mediation item "office equipment". "desktop" and "notebook" are fixedly set also with regard to an apparatus type which is determined by the know-how of the mediator. The number of apparatuses is set so as to be obtained by a calculating expression. The other items are set to blanks because they are determined by actually sending them to the backend servers 34-1 to 34-n.

When the abstract mediating request such as "We want to establish an office in front of a station" by the user utilizing the client 28 provided for the WWW browser 30 is received, the logic processing unit 15 provided for the mediation service processing unit 12 in FIG. 1 analyzes the abstract request from the user and recognizes that it is the request for the office establishment. A mediation menu picture plane 36 as shown in FIG. 4 for allowing the user to select the office scale and request the mediation is formed by an HTML forming mechanism by the user interface processing unit 16 and displayed by the WWW browser 30 of the client 28. Check boxes 38, 40, and 42 corresponding to the office establishment of three kinds of small, middle-sized, and large scales are provided for the mediation menu picture plane 36. When the office desired by the user is, for example, small, he clicks the check box 38 and presses a start button 44. In response to it, the logic processing unit 15 in FIG. 1 reads out the mediating condition list data 18-1 for the small office in FIG. 2 from the mediating condition list file 18 and converts the abstract request from the user into the mediating conditions (matching conditions) serving as a specific request for the backend servers 34-1 to 34-n. After the logic processing unit 15 read out the specific mediating condition list data corresponding to the abstract request from the user from the mediating condition list file 18, a process for deciding insufficient conditions in the mediating condition list data by the inquiry of the personal information file 22 and of the user of the client 28 is performed.

In the mediating condition list data 18-1 for the small office in FIG. 2, a reference code "NULL" which designates the reference to the user personal information has been stored in "city name" in the head mediation item "real estate". Therefore, the logic processing unit 15 inquires the personal information of the user who issued the mediating request to the personal information agent 20 provided for the open agent middleware 14. For example, assuming that the name of the user who issued the mediating request is "Taro Fuji", the personal information file 22 as shown in FIG. 3 has previously been registered in the personal information file 22 which is managed by the personal information agent 20 in correspondence to the name of Taro Fuji. A name, a password, an address, occupation, a work place, telephone (office and home), and further, a present location have been stored in the personal information file 22. The personal information agent 20 responds "Tokyo" as an address in the personal information file 22 to the inquiry about the city name of the user from the logic processing unit 15. Thus, "Tokyo" is set into the city name in "real estate". Subsequently, the logic processing unit 15 inquires of the WWW browser 30 of the client 28 about the number of persons at the time of establishing the office by using the HTML forming mechanism by the user interface processing unit 16 on the basis of the inquiry code "REQUIRED" with respect to "the number of persons" in the mediation item "real estate". When the user answers the number of persons in response to the inquiry, the inquiry code "REQUIRED" is rewritten to the number of persons obtained by the answer of the user. When the answer of the number of persons in the office is obtained from the user, by substituting the number of persons which the user answered into a predetermined calculating expression in correspondence to a next calculation code "CALCULATION", the size of office is calculated. Further, with respect to the second and third mediation items "office furniture" and "office equipment", a numerical value of the number of persons who obtained the user's answer by the mediation item "real estate" is set into the calculation code "CAL." of "the number of desks". By the inquiry of the personal information, user inquiry, and further, the calculating process, the whole mediating condition list data 18-1 serving as a specific request for the backend servers 34-1 to 34-n is decided.

FIG. 6 is an explanatory diagram of a management picture plane in which a status of the decision of the mediating condition list data for the user request by the mediation service processing unit 12 is displayed in the mediator server 10.

A management picture plane 46-1 in FIG. 5 is a management picture plane with respect to the mediation item "real estate" at the time of performing a menu selection of the small office by clicking the check box 38 in FIG. 4 with a mouse. In the initial state of the menu selection, "office", "train", and "lease" have been preset to the type, commuting, and contract form, respectively. The personal information reference code "NULL", user inquiry code "REQUIRED", and calculation code "CALCULATION" have been stored in the city name, the number of persons, and size, respectively.

FIG. 6 is a management picture plane 46-2 with respect to the city name, the number of persons, and size in the management picture plane 46-1 in FIG. 5, in which each of the mediating conditions has been decided by the inquiry about the personal information of the city name, the inquiry of the user about the number of persons, and the calculation based on the answer result about the number of persons from the user. In this case, the city name is set to "Tokyo" by the inquiry about the personal information, the number of persons is set to "10" by the user inquiry, and the size is set to "100" square meters from the calculating expression based on the number of persons (10 persons) of the user's answer.

FIG. 7 shows a management picture plane 46-3 in the case where the mediation item "Office furniture" is selected with respect to the management picture plane 46-1 in FIG. 5. FIG. 8 shows a management picture plane 46-4 in the case where the mediation item "Office equipment" is selected subsequently to the management picture plane 46-3 in FIG. 7. The management picture planes shown in FIGS. 5 to 8 and based on the mediating condition list data 18-1 for a small office can be also used as forming picture planes for forming the data in the mediating condition list file 18-1 in the mediator server 10. That is, as shown in FIG. 5, 7, or 8, the management picture planes of the necessary management items are opened, the correction and change, and further, the addition of the mediating conditions, and the like are performed with respect to the necessary portions in the mediating conditions listed in each management picture plane, and a registering process to the directory is performed, so that the corrected mediating condition list data can be stored in the mediating condition list file 18. Even in a case where new mediating condition list data is added, it can be added by similarly opening the management picture planes, setting the mediating conditions and their specific contents, and adding them into the directory.

FIG. 9 is a management picture plane showing a directory structure of the mediating condition list file 18 in FIG. 1 in which the mediating condition list data 18-1 to 18-3 in FIG. 2 has been stored. A directory structure 50 is displayed as a mediation menu on the left side. A mediation item selection display 52 can be performed on the right side. In the directory display 50, when the mediation menu picture plane 36 as shown in FIG. 4 is presented in response to the abstract request of the user and a small office is selected by clicking the check box 38, the mediating condition list data 18-1 having the directory structure as shown in hatched portions is selected and read into the logic processing unit 15.

The mediating condition list data which is used for the office establishing service shown in FIG. 9 is constructed by the three kinds of mediating condition list data 18-1, 18-2, and 18-3 according to the large, middle, and small offices as shown in FIG. 2 and includes the mediation items "Real estate", "Office furniture", and "Office equipment", respectively. When seen from the menu selection in FIG. 5, the data structure of one layer is used as a directory structure. For such mediating condition list data of one layer, the mediating condition list data having a data structure of a plurality of layers as shown in FIG. 10 can be also defined in the mediating condition list file 18. In a mediating condition management picture plane 54 in FIG. 10, mediating conditions B1, B2, . . . of the second layer exist under a most significant mediating condition A1. Mediating conditions C1 and C2 of the third layer exist under the mediating condition B1 of the second layer. Mediating conditions D1, D2, and D3 of the fourth layer exist under the mediating condition C1 of the third layer. Mediating conditions D4 and D5 of the fourth layer exist under the mediating condition C2 of the third layer. With respect to the data structure of the mediating conditions of a plurality of layers, when the user sequentially selects the mediating conditions on the menu picture plane from the highest layer and selects the mediating conditions in each layer, a plurality of mediating condition items are read. If a personal information inquiry code exists therein, it is extracted from the personal information file 22 and set by the personal information agent 20. If there is a user inquiry code, the apparatus inquires of the user. If there is a calculation code, the decision mediating conditions are determined by a calculation on the basis of the decision of the specific mediating condition. In this manner, the above processes are repeated every mediating conditions of each layer. By such a layer structure, the abstract mediating request of the user can be properly narrowed down to the specific requests to the actual backend servers 34-1 to 34-n.

When all of the necessary mediating conditions of the mediating condition list data read out from the mediating condition list file 18 on the basis of the user request are decided by the logic processing unit 15 provided for the mediation service processing unit 12 in FIG. 1, the logic processing unit 15 outputs the decided mediating condition list data to the mediating agent 24 and field reactor agent 25 of the open agent middleware 14, performs the matching of the service information between the unit 15 and the backend servers 34-1 to 34-n in the service providing server group 35, and executes mediating processes such as collection, selection, negotiation, and the like of the necessary information which are similar to the processes actually executed by the mediation providers in the actual world. Specifically speaking, the logic processing unit 15 first notifies the mediating agent 24 of the three mediation items "Real estate", "Office furniture", and "Office equipment" in case of, for example, the mediating condition list data 18-1 for a small office in FIG. 2. The mediating agent 24 which received those mediation items sends the three kinds of mediation items to the backend servers 34-1 to 34-n and inquires whether the services are provided in response to the mediating request or not. In response to the service request from the mediating agent 24, the backend servers 34-1 to 34-n notify the mediating agent 24 of a will of their participation in response to the service providing request by the server function of each of the real estate traders, office furniture traders, and office equipment traders. Thus, the mediating agent 24 specifies the backend server who provides a service with respect to each of the mediation items "Real estate", "Office furniture", and "Office equipment" and notifies the logic processing unit 15 of the specific backend server. The logic processing unit 15 receives the introduction of the backend server on the mediation destination side from the mediating agent 24, specifies the backend server on the service providing destination side, notifies the field reactor agent 25 of the specific mediating conditions of the mediation items "Real estate", "Office furniture", and "Office equipment" shown in FIG. 2, and executes the processes such as collection, selection, negotiation, and the like of the necessary information between the unit 15 and the backend servers 34-1 to 34-n, respectively. If the service information can be collected with respect to each of the mediation items "Real estate", "Office furniture", and "Office equipment" from the field reactor agent 25 as mentioned above, the unit 15 forms service providing lists in order of prices and displays the service information which can be provided to the WWW browser 30 held by the client 28 by using the HTML forming function of the user interface processing unit 16.

FIG. 11 shows a mediation answer picture plane 601 which is sent from the mediator server 10 to the WWW browser 30 of the client 28 and displayed when the user clicks the check box 38 on the menu picture plane 36 in FIG. 4 by using the mouse and operates the start button 44. Service providing lists are displayed in order of the prices. That is, the cheapest property is "Total cost ¥ 7,558,000" and specific mediating information is described with respect to the mediation items "Real estate" and "Office furniture", respectively. With regard to the mediation item "Office equipment", specific service contents can be displayed by scroll displaying the picture plane as shown in FIG. 12. A head portion of "Total cost ¥ 7,559,000" serving as a next introducing property is displayed on a scrolled mediation answer picture plane 60-2. Therefore, the user checks the contents on the mediation answer picture planes 60-1 and 60-2 as shown in FIGS. 11 and 12 while scrolling them. If the head property in FIG. 11 is decided, it is sufficient to click an order button 62. If he does not satisfy with any of the properties, a retry button 64 is clicked. When retrying, the user properly corrects the service contents in the properties which have already been introduced as necessary and operates the retry button 64, thereby enabling the next mediation services to which a desire of the user is reflected to be provided. For example, if the user desires X company rather than a manufacturer "Y company" in the mediation item "Office furniture" in FIG. 11, by correcting the manufacturer to "X company" as a mediating condition and pressing the retry button 64, the mediating process according to the changed mediating condition is performed. A property list based on the conditions after the correction is displayed again. If the user decides a specific property by the order button 62, whether the mediation result is reflected to the mediating condition list file in the logic processing unit 15 in the mediation service processing unit 12 or not is discriminated. If it is reflected, a process for newly forming or correcting the mediating condition list data based on the mediation result is executed. Thus, the know-how of the mediation service result finally decided through the communication with the user can be applied to the mediating condition list data which can be used for the next mediation services.

Figure 13A:
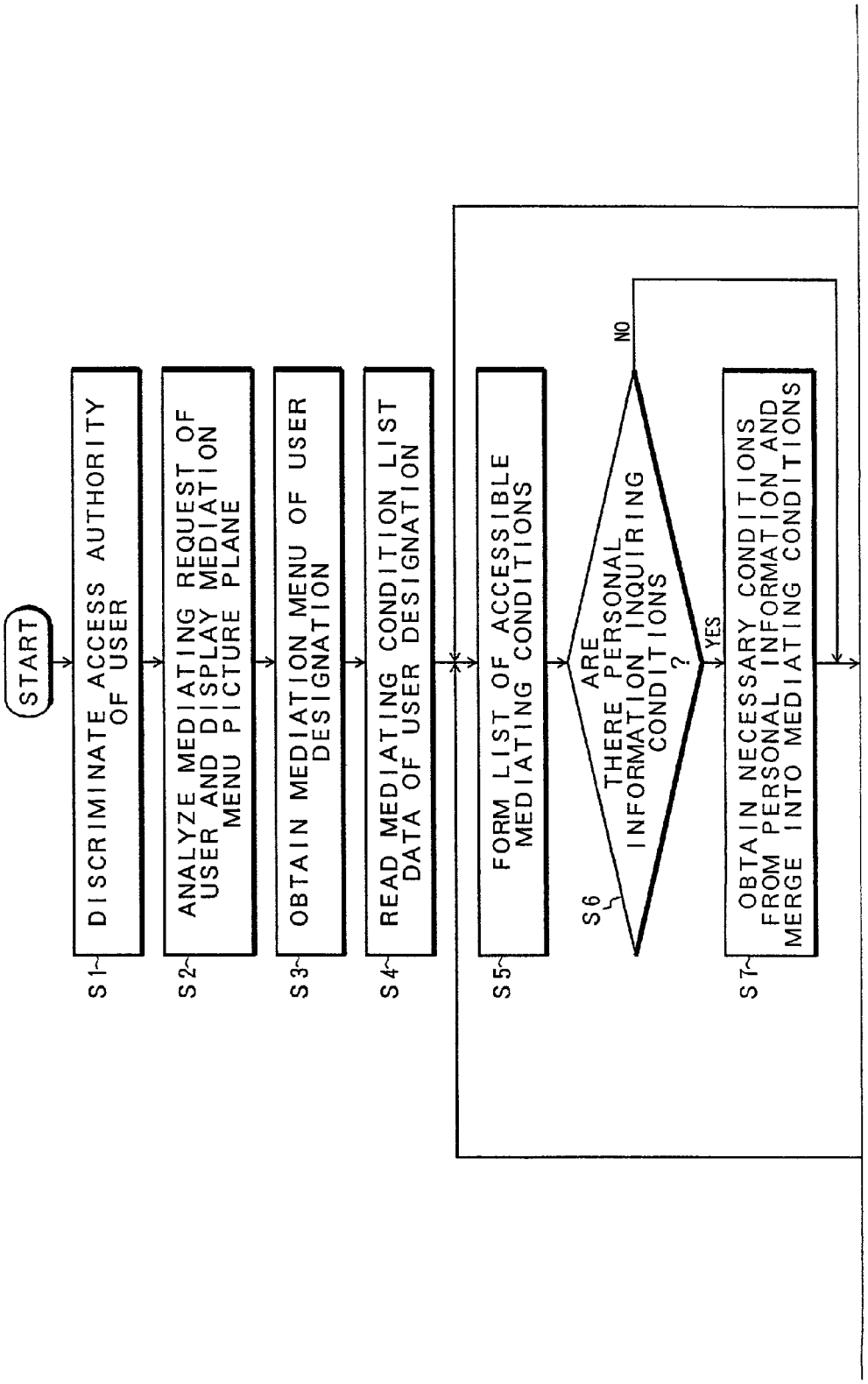
Figure 13B:
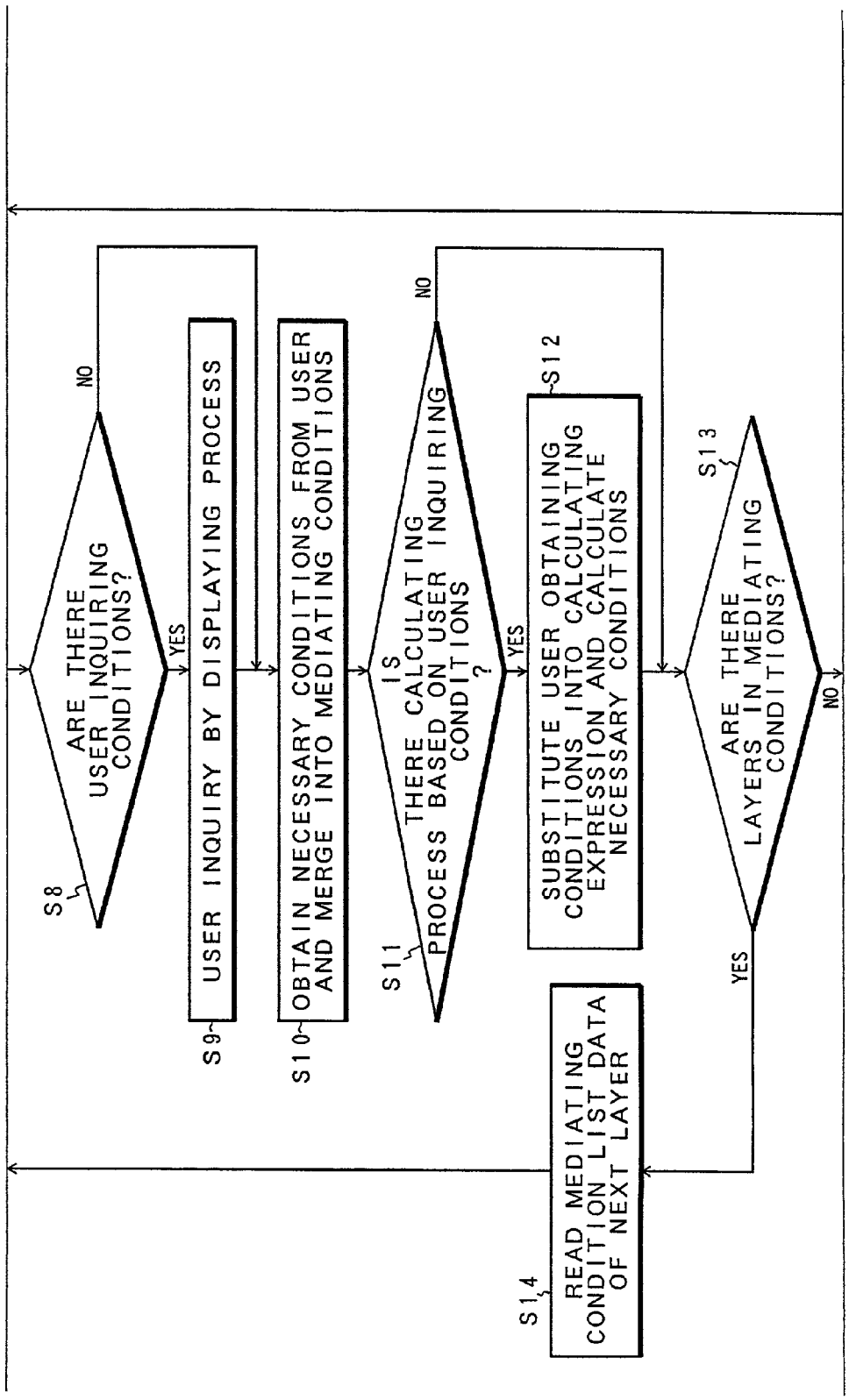

FIGS. 13A, 13B, and 13C show an example of a typical flowchart by the mediation service processing unit 12 provided in the mediator server 10 in FIG. 1. When the user issues an abstract mediating request to the mediator server 10 by using the WWW browser 30 of the client 28, first, in step S1, the personal information of the user is obtained from the personal information file 22 by the personal information agent 20, and an access authority of the user is discriminated from, for example, a password "aaaaaa" of the user included in the personal information file 22 as shown in FIG. 3. Subsequently, the abstract mediating request of the user is analyzed in step S2. A mediation menu picture plane corresponding to it is displayed as shown in, for example, FIG. 4. When the user selects the menu on the mediation menu picture plane, the mediation menu of the user designation is obtained in step S3. The mediating condition list data of the user designation is read out from the mediating condition list file 18 in step S4. The mediating condition list data which can access to the backend servers 34-1 to 34-n is formed in step S5. If the item for inquiry of the personal information exists in the mediating condition list data in step S6, the necessary conditions are obtained from the personal information file 22 by inquiring of the personal information agent 20 and merged into the mediating conditions in step S7. If there are user inquiring conditions in step S8, the apparatus inquires of the user by the displaying process according to the HTML forming mechanism of the user interface processing unit 16 in step S9. When the necessary conditions are obtained from the user in step S10, the obtained conditions are merged into the mediating conditions. Further, if there are conditions which need a calculating process based on the user inquiring conditions in step S11, the necessary conditions are calculated by substituting the user obtaining conditions into the calculating expression in step S12. Subsequently, if the mediating conditions have a layer structure in step S13, step S14 follows and a group of mediating condition items of the next layer is read. The processes from step S5 are repeated. If the processes of all layers or the layers do not exist in step S13, step S15 follows. Each mediating condition is sent to the backend server of the service provider on the basis of the decided mediating condition list data and a matching process with response information is performed. When the matching process is finished, the mediation result is displayed by the HTML forming mechanism of the user interface processing unit 16 and presented to the user by the WWW browser 30 of the client 28 in step S16. On the basis of the user presentation of the mediation result, if it is determined in step S17 that there is an order from the user, a mediation concluding process is performed in step S18. In the mediation concluding process, commodities or services are actually ordered to the backend servers 34-1 to 34-n. If there is not an order from the user but there is a retrying request in step S17, the conditions are changed in step S21 and the processing routine is returned to step S5 in FIG. 13A in order to retry. After the mediation concluding process based on the user's order is finished in step S18, whether the decided mediation result is reflected to the mediating condition list data or not is discriminated in step S19. If it is reflected, a new formation or a correction of the mediating condition list data based on the mediation result is performed in step S20. In step S20, an operation history showing the communication with the user at the time of referring to the personal information is further stored in the personal information file 22. If there is the same user mediating request after that, the operation history is read out from the personal information file 22 and set as a default. Thus, the operation load of the user at the time when a similar mediating request is received after the operation history was stored is reduced. It is also possible to construct the apparatus in such a manner that the mediation concluding process in step S18 is not included in the process of the mediation service processing unit 12 of the invention but the decided service providing contents are realized by using another dedicated ordering system.

A computer-readable storage medium in which the information mediating program has been stored according to the invention will now be described. Although the information mediating program of the invention is constructed by the logic processing unit 15 and user interface processing unit 16 provided for the mediation service processing unit 12 in FIG. 1, since the user interface processing unit 16 is the HTML forming mechanism to perform a displaying process for displaying the information to the user, an existing program can be used as it is as such an HTML forming mechanism. Therefore, the information mediating program necessary for the invention corresponds only to the portion of the logic processing unit 15. The mediating condition list file 18 is provided as data which is indispensable for executing the information mediating program. The information mediating program of the invention to realize the logic processing unit 15 forms mediation service information such that the mediating condition list data describing the specific mediating conditions for the backend servers 34-1 to 34-n is stored in an external mediating condition list file, the mediating condition list data designated in response to the abstract mediating request of the user is read out from the mediating condition list file 18, the specific mediating conditions of the read-out mediating condition list data are obtained and merged by referring to another information file such as personal information or the like, by inquiring of the user, and/or by performing a calculating process based on a predetermined mediating condition, the mediating condition list data determined as mentioned above is notified to a group of backend servers of the service provider, and the service information which satisfies the mediating condition list data is collected and selected and presented to the user. Such an information mediating program of the invention is stored in a portable storage medium such as CD-ROM, floppy disk, DVD magnetooptic disk, IC card, or the like or installed from a database or another computer system by using a modem or an LAN interface. The information mediating program of the invention installed as mentioned above is inputted to the computer system and executed, for example, as a mediator server 10. The information mediating program of the invention which is installed in the computer is stored in a hard disk HDD and executed by a CPU by using an RAM or the like.

According to the invention as mentioned above, a portion to be developed every user in order to provide the mediation services is small and so long as the application field is similar to the service which has been provided, the logic processing unit realized as a program can be used. It is sufficient to prepare the mediating condition list data and the personal information. Therefore, a period which is necessary until the services are provided can be remarkably reduced, for example, from a few months required so far to about a few days.

With respect to a system construction of the mediation services of the invention, it is possible to easily perform the operation sharing such that the system provider develops the portion of the logic processing unit of the mediating service processing unit, the user interface processing unit as an HTML forming mechanism is customized, the mediator forms the mediating condition list data by his own know-how, and further, the user who uses the services registers the personal information. The development can be easily shared and the maintenance can be also easily performed by similarly sharing it.

According to the invention, the user issues an uncertain, rough, and abstract mediating request and merely selects the mediation menu displayed in response to it, so that the mediating condition list data prepared by the mediator by using the know-how and the specific mediating condition list data which is actually inquired of the backend server of the service provider by using the personal information of the user are properly obtained. The detailed mediation service information can be provided in response to the abstract mediating request of the user.

With respect to the mediating condition list data using the know-how of the mediator serving as a base of the mediating process, even if the mediating condition list data does not exist at the start of the operation, it can be determined by communication with the mediator in response to the mediating request from the user. By storing the mediating condition list data which has once been decided into a file, it can be used for the next mediation service. The discovery and accumulation of the know-how can be dynamically reflected to the mediation services.

The mediating condition list data which is used for the mediation services and the personal information are coupled and the requirements regarding the personal information of the user of the mediating condition list data are obtained from the personal information which has previously been registered, thereby wiping away the troublesomeness of the input of the user, the registered personal information is effectively utilized, and the fine mediation services can be provided.

Further, with respect to the dynamic requirements such as term, the number of persons, and the like which cannot be realized by the mediating condition list data or personal information or with respect to the conditions which cannot be specified, by allowing the user to input them by inquiring of the user, the good mediation service information can be provided by the matching of high precision to which the desire of the user is sufficiently reflected.

Although the invention has been mentioned with respect to an example of the office establishing service as a mediation service, the invention covers very wide and a variety of mediation services. So long as the service provider is in an environment such that the provider constructs the backend server via the network and provides services, the invention can be applied to all of the services which are provided artificially at present by the mediator.

Although the above embodiment relates to an example of the personal information as another information which is merged into the mediating condition list data, the other proper information necessary for mediation can be merged as a target. Although the embodiment relates to an example of the case where the group of service providing servers are searched in a real-time manner on the basis of the mediating request from the user and the mediation services are provided, it is also possible to previously fetch the information held by the service providing server group to the mediation server and search the fetched information. By previously fetching and searching the information held by the service providing server group as mentioned above, for example, an inconvenience such that the user is made to wait for the mediation reception by the searching process for the service providing server group can be eliminated. The mediating request can be received without making the user wait.

The mediation services according to the invention are not always limited to the commodity transaction or service presentation accompanied with money amount but can be also applied to a production plan, an inventory control, or the like which is not accompanied with money transaction. Further, the invention incorporates many proper modifications without losing the objects and advantages of the invention. Moreover, the invention is not limited by the numerical values shown in the foregoing embodiment.

What is claimed is:

1. An information mediating apparatus for providing mediation services for a user, comprising:
   a mediating condition storing unit in which mediating condition list data describing specific mediating conditions necessary for mediation has been stored; and
   a mediation service processing unit which reads out the mediating condition list data designated in correspondence to a user request from said mediating condition storing unit, obtains information selected from another information storing unit on the basis of one item selected from a plurality of items described in specific conditions for the specific conditions having unfixed contents in the read-out mediating condition list data by merging the specific conditions, with said mediating conditions, generates mediation result information which satisfies said mediating condition list data including the specific conditions having the thus fixed contents; and
   a displaying unit that displays to the user said mediation result information that includes a list of items to be acquired by the user,
   wherein, in the case where a calculating instruction exists in the read-out mediating condition list data, said mediation service processing unit executes a predetermined calculating expression of the basis of other mediating conditions and merges a result of said calculation.

2. An apparatus according to claim 1, wherein said mediation service processing unit comprises:
   a user interface processing unit which forms display information comprising a mediation menu and a mediation result and presents said display information to the user; and
   a logic processing unit which reads out said mediating condition list data, notifies a service providing server group of said read-out data, and forms mediation result information by matching with service information.

3. An apparatus according to claim 1, wherein said mediation service processing unit designates and reads out specific mediating condition list data by analyzing an uncertain, rough, and abstract request from the user.

4. An apparatus according to claim 1, wherein when an uncertain, rough, and abstract request is received from the user, said mediation service processing unit presents a selection menu in which request contents are divided into items to the user and designates and reads out the specific mediating condition list data in correspondence to selected menu items.

5. An apparatus according to claim 1, wherein in a case where a referring instruction of personal information exist in the read-out mediating condition list data, said mediation service processing unit extracts corresponding personal information and merges it with reference to a personal information storing unit.

6. An apparatus according to claim 1, wherein in a case where a referring instruction of personal information exist in the read-out mediating condition list data, said mediation service processing unit extracts corresponding personal information and merges it with reference to a personal information storing unit, and in the case where the corresponding personal information does not exist, said mediation service processing unit requests the user to input the personal information.

7. An apparatus according to claim 1, wherein in a case where an inquiring instruction to the user exist in the read-out mediating condition list data, said mediation service processing unit requests the user to input personal information.

8. An apparatus according to claim 1, wherein in a case where an inquiring instruction to the user exist in the read-out mediating condition list data, said mediation service processing unit merges corresponding personal information as default values by referring to a personal information storing unit and, thereafter, requests the user to input the personal information while presenting said default values.

9. An apparatus according to claim 1, wherein said mediation service processing unit executes a predetermined calculating expression on the basis of conditions merged by referring to a personal information storing unit or by inquiring of the user and merges a result of said calculation into said calculating conditions.

10. An apparatus according to any one of claims 5 to 8, wherein in a case where the mediating condition list data read out from said mediating condition storing unit has a layer structure, said mediation service processing unit obtains unfixed conditions by sequentially referring to the referring instruction, the user inquiring instruction, or the calculating instruction of the personal information storing unit from a predetermined layer, and merging them.

11. An apparatus according to claim 1, wherein said mediation service processing unit forms previously presented mediating condition list data on the basis of a mediation result presented to the user and decided and stores it into said mediating condition storing unit.

12. An apparatus according to claim 1, wherein the list of items include at least one of real estate information, office furniture information, or office equipment information.

13. An information mediating method of providing mediation services for the user, comprising:
   storing mediating condition list data describing specific mediating conditions necessary for mediation into a mediating condition storing unit;
   reading out the mediating condition list data designated in correspondence to a user request from said mediating condition storing unit;
   for specific conditions having unfixed contents in the read-out mediating condition list data, obtaining information selected from another unit on the basis of one item selected from a plurality of items described in said specific conditions, and merging the same to fix the contents thereof;
   generating mediation result information which satisfies said condition list data; and
   displaying said mediation result information includes a list of items to be acquired by the user,
   wherein, in a case where a calculating instruction exists in the read-out mediating condition list data, a mediation service processing unit executes a predetermined calculating expression of the basis of other mediating conditions and merges a result of said calculation.

14. A method according to claim 13, wherein the list of items include at least one of real estate information, office furniture information, or office equipment information.

15. A computer-readable storage medium in which an information mediating program for providing mediation services for the user has been stored,
   said information mediating program causing the computer to execute a process comprising:
   storing mediating condition list data describing specific mediating conditions necessary for mediation into a mediating condition storing unit;
   reading out the mediating condition list data designated in correspondence to a user request from said mediating condition storing unit;
   for specific conditions having unfixed contents in the read-out mediating condition list data, obtaining information selected from another unit on the basis of one item selected from a plurality of items described in said specific conditions and merging the same to fix the contents thereof;
   generating mediation result information which satisfies said condition list data; and
   displaying said mediation result information that includes a list of items to be acquired by the user,
   wherein, in a case where a calculating instruction exists in the read-out mediating condition list data, a mediation service processing unit executes a predetermined calculating expression of the basis of other mediating conditions and merges a result of said calculation.

16. A computer-readable storage medium according to claim 15, wherein the list of items include at least one of real estate information, office furniture information, or office equipment information.

17. A method of providing intermediary services to a user, comprising:
   storing in a computer a list of intermediary service information for each of the services the intermediary service information list comprising fixed service information and a variable information source;
   receiving a service request from a user and identifying a service on the list;
   obtaining variable service information from the variable information source for the service of the request identified on the list;
   merging the fixed service information and the variable service information to provide the intermediary service of the service request to the user responsive to the merged information; and
   displaying the merge information that includes a list of items to be acquired to by the user,
   wherein, in a case where a calculating instruction exists in a read-out mediating condition list data, a mediation service processing unit executes a predetermined calculating expression of the basis of other mediating conditions and merges a result of said calculation.

18. A method according to claim 17, wherein the list of items include at least one of real estate information, office furniture information, or office equipment information.

19. A method of providing an information services to a user using a computer, comprising:
   storing information in a computer comprising a list of services and information about each service comprising non-variable information and a location identifier of a variable information source that includes variable information specific to each of the services;
   receiving a service request from a user including constraint information, analyzing the request, identifying a service on the list and determining additional information conditions from the constraints;
   obtaining variable information from the variable information source for the service of the request identified on the list using the location identifier and the information conditions;
   performing information computation operations using the non-variable information, the variable information, the information conditions and the constraints to produce computed information;
   combining the computed information, non-variable information and the variable information to provide the computed information, non-variable information and the variable information to the user responsive to the request; and displaying the computed information, non-variable information and the variable information to the user as a list of items to be acquired by the user, wherein, in a case where a calculating instruction exists in a read-out mediating condition list data, a mediation service processing unit executes a predetermined calculating expression of the basis of other mediating conditions and merges a result of said calculation.

20. A method according to claim 19, wherein the list of items include at least one of real estate information, office furniture information, or office equipment information.

* * * * *

UNITED STATES PATENT AND TRADEMARK OFFICE
CERTIFICATE OF CORRECTION

PATENT NO. : 7,403,920 B2 Page 1 of 1
APPLICATION NO. : 09/738285
DATED : July 22, 2008
INVENTOR(S) : Masaaki Nishikiori et al.

It is certified that error appears in the above-identified patent and that said Letters Patent is hereby corrected as shown below:

Column 16, Line 34, change "to by" to --by--.

Signed and Sealed this

Twenty-third Day of December, 2008

JON W. DUDAS
*Director of the United States Patent and Trademark Office*